No. 863,207. PATENTED AUG. 13, 1907.
E. W. OLDS.
FIELD COIL TERMINAL CONNECTION.
APPLICATION FILED OCT. 18, 1905.
Fig. 1.
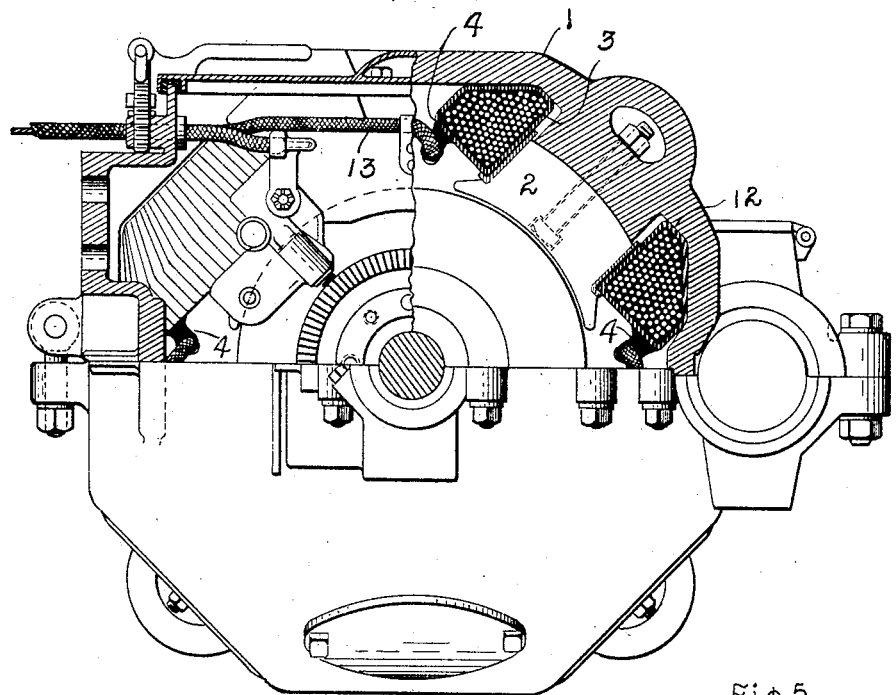
Fig. 2.
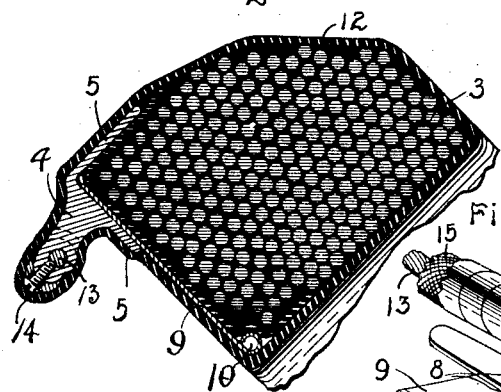
Fig. 5.
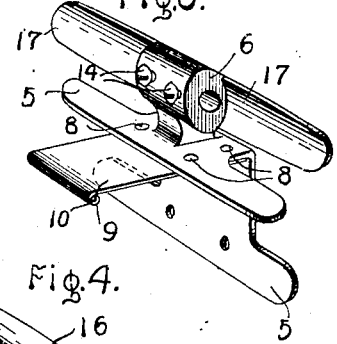
Fig. 3.
Fig. 4.
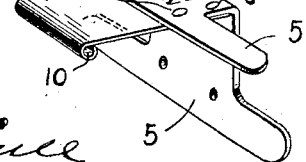
WITNESSES:
J. Ellis Glen.
Benjamin B. Hull
INVENTOR.
Edwin W. Olds.
by Albert G. Davis
Att'y.

UNITED STATES PATENT OFFICE.

EDWIN W. OLDS, OF MILWAUKEE, WISCONSIN, ASSIGNOR TO GENERAL ELECTRIC COMPANY, A CORPORATION OF NEW YORK.

FIELD-COIL TERMINAL CONNECTION.

No. 863,207.

Specification of Letters Patent.

Patented Aug. 13, 1907.

Application filed October 18, 1905. Serial No. 283,231.

*To all whom it may concern:*

Be it known that I, EDWIN W. OLDS, a citizen of the United States, residing at Milwaukee, county of Milwaukee, State of Wisconsin, have invented certain new and useful Improvements in Field-Coil Terminal Connections, of which the following is a specification.

Heretofore trouble has been experienced in satisfactorily securing leads to the terminals of the field coils of electric motors used for railway purposes. In a form commonly used terminal members for the field coil conductors are permanently secured to the field coil structure and are provided each with a socket into which the bared end of a lead from the coil in the form of a flexible, heavily insulated cable is inserted and secured by means of clamping screws, solder, or both. With the vibration inherent in the operation of railway motors it has been found that the cables are apt to break at the point at which they leave the terminals.

Owing to the necessity for a simple and reliable construction and the necessity of having the parts heavily insulated, it has been found difficult to avoid this defect. I have found, however, that this trouble may be avoided, if the body of the insulated cable forming the lead, is secured to or supported by a member which is in turn rigidly secured to the terminal.

The various features of novelty which characterize my invention are pointed out with particularity in the claims annexed to and forming a part of this specification. For a better understanding of my invention, however, reference may be had to the accompanying descriptive matter and drawings in which I have described and illustrated forms in which my invention may be embodied.

Of the drawings, Figure 1 is an end elevation with parts broken away and in section of a railway motor embodying my invention; Fig. 2 is an enlarged sectional elevation of a portion of one of the field coils of the motor; Fig. 3 is a perspective view of a terminal attached to its lead with the supporting device in place and with a portion of the tape removed; Fig. 4 is a perspective view of the detachable supporting device employed, and Fig. 5 is a perspective view illustrating a modified construction.

In the drawings, 1 represents the casing of a railway motor of a well known type. Around each of the internally projecting pole pieces 2 of the motor is placed a field coil 3. In constructing a field it is wound in a suitable form into substantially the shape shown, after which two terminal members 4 are secured in place. As shown, each terminal member comprises a pair of similar wings or flanges 5 at right angles to each other. From one of the flanges 5 extends a neck at the outer end of which is a substantially cylindrical portion 6 provided with an axially extending socket 7. To one of the flanges is secured by rivets 8 and solder, an extension 9 of sheet copper or the like. The free end of which is curled up to form a socket 10 into which one end of the conductor forming the coil 3 is soldered. After the terminals are secured in place the coil is ordinarily immersed in some insulating fluid, covered over with some suitable insulating tape 12 which extends over the flanges of the terminal members but not over the projection 6, and is baked to form a rigid, solid body of which the terminals form a part.

When the field coils thus prepared are secured in place about the pole pieces, a conductor or terminal lead 13 is secured in each socket 7 by means of set screws 14 and usually also by solder. Each conductor 13 is covered with a heavy insulating jacket 15 which is cut away to expose the portion of the conductor inserted in the socket. Usually the insulating jacket is of an external diameter substantially equal to the cylindrical portion 6.

To prevent the cable from being jarred off at the point where it leaves the socket 7, I have provided a guard or supporting device shown in Fig. 4, which may be in the form of a piece of sheet metal bent to fit against the outer surfaces of the cylindrical portion of the extension and the outer surface of the insulated lead. As shown, the member 16 is formed with a slot at one end to receive the set screws 14. After the lead is secured in the socket with the guard in place the whole is taped together. As a result, the end of the lead, the guard 16 and the terminal form a substantially rigid structure, and the jarring of the motor or similar causes, will not cause the lead to be given sharp bends where it leaves the portion 6. The insulating jacket 15 prevents the jarring of the motor from injuring the cable by giving it sharp bends beyond the outer end of the support 16.

In the construction shown in Fig. 5 a terminal member 4 is employed which is substantially similar to the terminal member 4 just described, except that it is provided with integral extensions 17 from the socketed cylindrical portion 6' each of which may be substantially similar in shape to the guard or support 16 and may perform the same function. Each terminal is provided with two extensions 17, since in some instances it is desired to bring the cable away from one end of the cylindrical portion of the terminals, and in other cases from the other end.

In order to make terminals interchangeable the flanges 5 are made similar and are each provided with holes to receive rivets 8 in order that the extension 9 may be secured to either flange as desired.

Each of the forms of my invention disclosed have been found reliable and successful in actual practice on a commercial scale.

The form shown in Figs. 1 to 4 inclusive, possesses the advantage that the support can be applied readily to motors already in service without disturbing the structure of the field coils.

It will be apparent that changes may be made in the form of my invention without departing from its spirit, and I do not intend that the claims hereinafter made shall be limited to the specific forms disclosed more than is made necessary by the state of the art.

What I claim as new and desire to secure by Letters Patent of the United States, is:

1. In a railway motor, a field coil, a terminal member secured thereto, said terminal member being formed with a socket, a terminal conductor or lead provided with an insulating jacket surrounding its body portion but having one end bare, means for securing the bared end of the conductor in the socket in said terminal member, and a guard or support secured to an insulated portion of said lead and to said terminal.

2. In combination, a pair of conductors, one of said conductors being formed with a socket and the other conductor being secured in said socket, insulating material surrounding said other conductor adjacent said socket, and a guard secured to said one conductor and against the insulating material surrounding said other conductor.

3. In combination, a field coil having permanently secured thereto a terminal member provided with a cylindrical portion having an axially extending socket formed in it, a lead in the form of a conductor surrounded by an insulating jacket and having one end bare, with the bared end secured in said socket, and a guard rigidly secured to said terminal and to the insulated portion of said lead.

4. In combination, a field coil having secured thereto a terminal member provided with a socketed portion, a lead in the form of a conductor a portion of which is surrounded by an insulating jacket, and another portion bare and secured in said socket, and a guard or support secured to said terminal and engaging the insulated portion of said lead.

5. In combination, a field coil having secured thereto a terminal member provided with a socketed portion, a lead in the form of a conductor, a portion of which is surrounded by an insulating jacket and another portion bare and secured in said socket, and a guard or support secured to said terminal, and engaging the insulated portion of said lead, said guard and insulated portion being taped together.

6. In combination, a field coil having secured thereto a terminal member provided with a socketed portion, a lead in the form of a conductor, a portion of which is surrounded by an insulating jacket and another portion bare and secured in said socket, and a guard or support secured to said terminal and engaging the insulated portion of said lead, said guard having a portion of its surface curved to fit against the outer surface of the lead.

In witness whereof I have hereunto set my hand this 13th day of Oct., 1905.

EDWIN W. OLDS.

Witnesses:
HENRY C. HOUSTON,
F. C. STIELER.